United States Patent [19]

Plummer et al.

[11] 4,147,637
[45] Apr. 3, 1979

[54] OIL RECOVERY BY INCREASING THE INJECTIVITY INDEX OF MICELLAR SYSTEMS CONTAINING CRUDE OIL SULFONATES

[75] Inventors: Mark A. Plummer; Stanley C. Jones, both of Littleton, Colo.

[73] Assignee: Marathon Oil Company, Findlay, Ohio

[21] Appl. No.: 830,229

[22] Filed: Sep. 2, 1977

[51] Int. Cl.² ............................................. E21B 43/22
[52] U.S. Cl. ................................. 252/8.55 D; 166/275
[58] Field of Search ................... 252/8.55 D; 166/275

[56] References Cited

U.S. PATENT DOCUMENTS

| | | | |
|---|---|---|---|
| 3,508,611 | 4/1970 | Davis et al. | 252/8.55 X |
| 3,682,249 | 8/1972 | Fischer et al. | 252/8.55 X |
| 3,938,591 | 2/1976 | Ossip et al. | 252/8.55 X |
| 3,951,828 | 4/1976 | Plummer | 252/8.55 |

*Primary Examiner*—Herbert B. Guynn
*Attorney, Agent, or Firm*—Joseph C. Herring; Jack L. Hummel

[57] ABSTRACT

Flooding hydrocarbon-bearing, subterranean formations with micellar systems containing crude oil sulfonates is improved by extracting wax from the micellar system before it is injected into the formation.

7 Claims, No Drawings

4,147,637

OIL RECOVERY BY INCREASING THE INJECTIVITY INDEX OF MICELLAR SYSTEMS CONTAINING CRUDE OIL SULFONATES

BACKGROUND OF THE INVENTION

1. Field of the Invention

This invention relates to injecting a micellar system into a subterranean formation and displacing it toward a production means to recover hydrocarbon therethrough. The micellar system is comprised of crude oil sulfonates.

2. Prior Art

Micellar dispersions are useful for recovering crude oil from subterranean formations; for example, see U.S. Pat. Nos. 3,254,714; 3,275,075; 3,506,070; 3,497,006; 3,613,786; 3,734,185; 3,740,343; 3,827,496; 3,964,548; and 3,827,496. The prior art generally teaches that the micellar dispersion is injected into the formation followed by a mobility buffer fluid and thereafter drive water to displace the previously injected fluids toward the production well. Pre-slugs can be injected before the micellar dispersion.

Injectivity of the micellar dispersion and other fluids used in the recovery process have always been of concern. It is desirable to have a high injectivity index to reduce the surface energy required for and to improve the displacement efficiency of the flooding process. Generally speaking, the amount of oil that can be recovered from the reservoir is directly dependent on the amount of fluid that can be injected into and displaced through the reservoir, discounting physical properties of the fluid, etc. Waxes have been and continue to cause major injectivity problems.

Examples of references relating to the extraction of wax are as follows:

British Pat. No. 134,215 (Nash et al.) teaches reduction of the wax content of mineral oils by contacting the mineral oil with a solvent, e.g. aliphatic monohydric alcohols, at a temperature above the melting point of the wax and thereafter cooling the solution to precipitate the wax. The solvents must be miscible with the wax-free mineral oil.

U.S. Pat. No. 2,063,369 (Diggs et al.) teaches extracting wax from wax-bearing oil by thoroughly mixing the oil with 1.5-2 volumes of dichloroethyl ether, then heating the mixture to 145°-170° F. and thereafter permitting it to settle.

U.S. Pat. No. 2,149,574 (Brown) teaches extracting wax from oils using chlorophenol.

U.S. Pat. No. 2,202,389 (Lewis et al.) teaches extracting hydrocarbon by contacting a hydrocarbon mixture with a light hydrocarbon containing 1-8 carbon atoms at a temperature between 38° C. and the critical temperature of the light hydrocarbon solvent, thereafter maintaining the mixture at a sufficient pressure to retain the light hydrocarbon solvent in the liquid phase whereupon two phases form.

U.S. Pat. No. 2,698,279 (Mondria) teaches extracting wax from mineral oils using a dewaxing solvent such as halogenated hydrocarbons; aliphatic and aromatic hydrocarbons such as petroleum ether, petroleum naphtha, gasoline, hexane, benezene, etc.; ketones; etc.

U.S. Pat. No. 3,302,713 (Ahearn et al.) teaches dewaxing petroleum distillates and then sulfonating them to obtain sulfonates desirable for flooding subterranean formations.

Liquid extraction of wax from crude oil is also taught in the Oil and Gas Journal, Dec. 12, 1929, Page 125, and British Pat. Nos. 149,347; 507,646; and 534,212. Examples of extraction solvents in the Oil and Gas Journal are ethyl, butyl, and amyl acetates, kerosene, etc.

Injection of micellar dispersions containing crude oil sulfonates is a particularly current problem. During injection the micellar system is cooled as it is transported from the surface facility to the well head. It is partially reheated as it is transported from the well head down to the sand face of the subterranean formation. Some of the insoluble wax crystals that form during cooling are not redissolved with the partial reheating and/or do not immediately go back into solution. These wax crystals tend to "block" or "plug" the reservoir rock as the micellar dispersion is being injected. This adverse effect is apparent even if the micellar dispersion has been filtered at high or low temperatures prior to injection. U.S. Pat. No. 3,951,828 teaches a solution to the problem by incorporating 0.01-10 percent by weight of a low molecular weight paraffinic hydrocarbon into the micellar dispersion. However, with this technology, the micellar dispersion must be subjected to a "fast cool-down rate" — i.e., greater than about 1° C./min in the 5°-15° C. wax crystalization range. The hydrocarbon keeps the lower molecular weight waxes which would form large "plate" or "needle" type crystals during cooling in solution and prevents reservoir plugging. The higher molecular weight waxes form very small mal type crystals which do not plug the reservoir. A description of wax crystal types can be found in Clarke, E. W., "Crystal Types of Pure Hydrocarbons in the Paraffin Wax Range", Industrial and Engineering Chemistry, Volume 43, Page 2526 (1951) and Ferris, S. W. and Cowles, H. C., "Crystal Behavior of Paraffin Wax", Industrial and Engineering Chemistry, Volume 37, Page 1054 (1945). However, when micellar systems are subjected to a "slow cool-down rate" — i.e., less than about 0.7° C./min in the 5°-15° C. range, the mal crystals formed are sufficiently large to cause reservoir plugging. Both types of cool-down rates can occur in various oil field applications.

SUMMARY OF THE INVENTION

Applicants have discovered a method of extracting wax from a micellar system containing crude oil sulfonates. "Micellar system" is defined as an aqueous mixture containing the crude oil sulfonate or a micellar dispersion, the latter has been used to define microemulsion, micellar solution, soluble oil, etc. Preferably the micellar system does not contain a cosurfactant.

The extraction is effected with an agent consisting essentially of paraffinic hydrocarbons or halocarbons having a molecular weight of about 50 to about 200. Aromatic extraction agents are not generally useful since they tend to be solubilized in the micellar system and have, under certain conditions, caused reduced oil recovery. Some aromatics can be tolerated, i.e. less than about 20% of the extraction agent. Extraction can be effected on the final micellar system, i.e. a micellar solution or microemulsion, before it is injected into the formation. The extraction also can be performed on the neutralized sulfonic acid stream from the sulfonation process simultaneously with removal of unsulfonated crude oil. The resulting micellar system can be subjected to "slow cool-down rates" or "fast cool-down rates" without adversely affecting injectivity of the system.

Extraction can be effected at about 5° to about 200° C. and at pressures sufficiently high to prevent vaporization of the extracting agent or the micellar system. About 0.5 to about 10 weights of the extraction agent per weight of active sulfonate, i.e. sulfonate molecule, are useful.

PREFERRED EMBODIMENTS

The crude oil from which the sulfonates are obtained contains wax; wax is defined as the precipitate which forms after one part of the hydrocarbon portion of the micellar system is dissolved in two parts of methyl-ethyl ketone at about 80° C. and the mixture is chilled to about −25° C. Wax content of the crude oil sulfonate can vary from about 0.001 to about 5.0 but is usually within the range of about 0.01 to about 1.0 weight percent, based on the weight of the active sulfonate. The wax can be paraffinic or microcrystalline and can have a molecular weight of about 240 to about 600.

The micellar system is composed of hydrocarbon, water, crude oil petroleum sulfonate, and optionally cosurfactant and electrolyte. Additional components can be added if desired. Preferably the cosurfactant is not present during the extraction step.

The crude oil sulfonates can be prepared by sulfonating whole or topped crude oil, preferably with $SO_3$, thereafter neutralizing the sulfonic acids with a base, preferably a monovalent base such as ammonium or sodium hydroxide, and then preferably removing a portion of the unsulfonated hydrocarbon and sulfonation by-products (e.g., ammonium or sodium sulfates or sulfites). Diluents or solvents can be added during the sulfonation process to enhance reaction conditions. Also, components can be added before or during the sulfonation process to obtain enhanced oil recovery properties.

The hydrocarbon within the micellar system is typically crude oil, a fraction of crude oil, unsulfonated crude oil from the sulfonation process, synthesized hydrocarbon, mixtures thereof, or like materials.

The water can be fresh or it can contain a moderate amount of salts. It should not contain components that adversely influence the oil recovery properties of the micellar system. Typically, the water contains about 5 to about 50,000 ppm of TDS (total dissolved solids).

The electrolytes are water soluble and can be an inorganic salt, inorganic base, inorganic acid, or mixtures thereof. Typically, the salts are reaction by-products from the sulfonation process, e.g. ammonium sulfate, ammonium sulfite, sodium sulfate, sodium sulfite, etc.

The cosurfactant, also known as a semi-polar organic compound, a co-solubilizer, etc., can be an organic compound containing 1 to about 25 or more carbon atoms and preferably about 3 to about 15 carbon atoms. It can be an alcohol, amide, amino compound, ester, aldehyde, ketone, complexes thereof, a compound containing one or more of amido, hydroxy, bromo, carbonato, mercapto, oxo, oxy, carbonyl, or like groups or mixtures thereof. Specific examples include isopropanol, butanol, amyl alcohol, hexanol, octanol, decyl alcohol, alkaryl alcohol such as n-nonylphenol and p-nonylphenol, 2-butoxyhexanol, alcoholic liquors such as fusel oil, ethoxylated alcohols and salts thereof, sulfated ethoxylated alcohols, hydrogenated hydrocarbons such as hydrogenated croton oil, amidized hydrocarbons, similar materials and mixtures thereof. The preferred cosurfactant is an alcohol; it can be a primary, secondary, or tertiary alcohol, or mixture thereof, and can optionally be ethoxylated and/or sulfated or sulfonated.

Concentrations of the components within the micellar system can vary depending upon the particular components used, the properties desired of the micellar system, the properties of the reservoir, the economics of the overall process, the compatibility of the different components within the micellar system, etc. Typically, the concentrations are about 1–90 percent, preferably about 2–40 percent and more preferably about 4–20 percent and most preferably about 5–15 percent hydrocarbon; 10–95 percent and preferably about 50–85 percent and more preferably about 60–80 percent of water; about 5 to about 20 and preferably about 6.5 to about 17.5 and more preferably about 8 to about 16 percent of active sulfonate [i.e., active sulfonate molecule, including the hydrocarbon portion and the sulfonate group(s)]; about 0.01 to about 20 percent and preferably about 0.1 to about 7.5 and more preferably about 0.2 to about 5 percent of the cosurfactant; and about 0.001 to about 10 percent and preferably about 0.5 to about 5.0 percent of electrolyte.

The micellar system is generally injected into the formation in volume amounts of about 1 to about 50 percent FPV (formation pore volume) and preferably about 4 to about 15 percent FPV. It can be followed by a mobility buffer, preferably an aqueous solution containing a water-soluble polymer which imparts permeability reduction to the formation and/or viscosity increase to the aqueous solution. The micellar system can be preceded by an aqueous pre-slug. A water drive is injected to displace the previously injected fluids toward the production well through which the crude oil is recovered.

Wax is extracted from the micellar system by contacting it with about 0.5 to about 10 and preferably about 1.0 to about 5.0 and more preferably about 1.5 to about 3.0 parts by weight of an extraction agent per part by weight of the active sulfonate within the micellar system. Examples of extraction agents include paraffinic hydrocarbons and paraffinic halocarbons having molecular weight of about 50 to about 200; the paraffinic hydrocarbon agent can contain up to 20% aromatic, e.g. kerosene. The molecular weight of the extraction agent is dependent upon the molecular weight of the wax in the crude oil sulfonate; e.g. higher molecular weight waxes generally require higher molecular weight extraction agents.

The micellar system is thoroughly contacted with the extraction agent at a temperature of about 5 to about 200 and more preferably about 20 to about 150 and most preferably at about 40° to about 100° C. Thereafter, the extraction agent and wax are separated, preferably by phase separation. Sufficient time should be allowed at the specified temperature to insure essentially complete separation of the wax. Typical separation times are about 0.4 to about 2.0 hours per foot of liquid (extraction agent and micellar system) height at 70° C. Preferably the micellar system is then filtered at temperatures within the range of about 10 to about 65 and preferably about 20° to about 40° C. before it is injected into the reservoir. By following the inventive process, the extracted micellar system can be subjected to temperature cycles without adversely affecting the injectivity of the micellar system.

The following examples are presented to teach working embodiments of the invention. The Millipore test in the examples is performed as follows: filtered slug (1000 mls) is passed through 0.8 micron Millipore paper at a constant pressure of 70 psig and at 18.3° C. The times required to pass the 50–100, 150–200, 250–300, 700–750, 800–850, and 900–950 mls effluent volumes are recorded. The desired Millipore ratio (MPR) is defined as the sum of the times required for the second three effluent volumes divided by the sum of the times required for the first three effluent volumes — i.e., MPR = (time in minutes for 700–750 + 800–850 + 900–950 effluent mls)/(time in minutes for 50–100 + 150–200 + 250–300 effluent mls).

To have an acceptable micellar system, the Millipore test results must be less than two. All micellar systems used in the following examples are derived via SO₃ sulfonation of an Illinois basin crude oil with an API gravity of about 35°.

EXAMPLE I

This example is presented to show the deficiencies of the process of U.S. Pat. No. 3,951,828. A crude oil sulfonate containing wax is used to make a micellar system having the following composition:

| Component | Weight Percent |
| --- | --- |
| 1. Water | 73.80 |
| 2. Salt | 3.44 |
| 3. Active Sulfonate | 11.88 |
| 4. Unsulfonated Crude | 8.38 |
| 5. Alkylate | 2.50 |

The alkylate is added as the wax solvent; it has a molecular weight of about 100 and is completely soluble in the micellar systems. For Cases 1 and 2, the filtered micellar systems containing alkylate are well agitated for 1.5 hours in glass containers placed in a constant temperature bath at 4.4° C. to yield a "fast cool-down rate" (i.e., about 1.2° C./min in the 12.8°–7.2° C. range) from the filtration temperature of 37.8° C. — the micellar systems reached 4.4° C. in a total of about 15 minutes. For Cases 3 and 4, the micellar systems containing alkylate are placed in polyethylene containers and are not agitated while being cooled down from 37.8° to 4.4° C. to yield a "slow cool-down rate" of about 0.6° C./min in the 12.8°–7.2° C. range — it takes a total of about 30–60 minutes for the samples to cool down to 4.4° C. Both of these cool-down rates simulate field injection condition under different circumstances after the micellar system is filtered on the surface and is transported therefrom to the well head. After the cool-down period, all of the micellar systems prior to Millipore testing are subjected to a "storage treatment" by heating the samples at 18.3° C. for 1.5 hours. This simulates transport of the micellar system from the well head to the sand face of the subterranean formation. In Cases 1 and 2, mixing is effected at 18.3° C. For Cases 3 and 4, mixing is not used.

Table I

| Case | Storage Prior to Filtration* Hours | ° C. | Millipore Result |
| --- | --- | --- | --- |
| 1 | None | — | 1.7 |
| 2 | 24 | 4.4 | 1.2 |
| 3 | None | — | >2 |
| 4 | 24 | 4.4 | >2 |

*Filtrations are performed at 37.8° C. after additional storage of 1.5 hours at 37.8° C.

The above results indicate that in Cases 1 and 2, which simulate fast cool-down rates and good agitation, the technology of U.S. Pat. No. 3,951,828 is adequate to pass the Millipore test. However, in Cases 3 and 4, which simulate slow cool-down rates, this technology yields failing Millipore tests — this is representative of the inadequacy of the prior art to solve the problem.

EXAMPLE II

To show the benefits of this invention over the prior art in Example I, this example is presented. Micellar systems with compositions identified in Table II are extracted with kerosene (molecular weight of about 120) to remove the wax simultaneously with the removal of a portion of the unsulfonated crude oil. The extractions are performed at 82.2° C at kerosene to active sulfonate ratios defined in Table II. The kerosene and wax, along with the unsulfonated crude oil, are removed via phase separation after eight hours of settling time at 82.2° C. The storage of the micellar systems prior to filtration is indicated in Table II. An additional storage of 1.5 hours at 37.8° C. is also employed prior to filtration at 37.8° C. In Samples 5, 6, 8, 9, 11, 12, and 14, the samples are subjected to a fast cool-down rate defined in Example I, whereas Samples 7, 10, 13, and 15 are subjected to a slow cool-down rate defined in Example I. The results of the Millipore tests are indicated in Table II:

Table II

| Sample No. | Micellar System Composition (wt %) Active Sulfonate | Water | Salt | Hydrocarbon | Weight of Kerosene Added per Weight of Active Sulfonate | Storage Prior to Filtration Hours | ° C. | Millipore Test |
| --- | --- | --- | --- | --- | --- | --- | --- | --- |
| 5 | 12.42 | 73.1 | 3.30 | 11.18 | 2.52 | None | | 1.2 |
| 6 | " | " | " | " | " | 18 | 4.4 | 1.1 |
| 7 | " | " | " | " | " | " | " | 1.6 |
| 8 | 12.17 | 72.6 | 3.13 | 12.10 | 2.56 | None | | 1.2 |
| 9 | " | " | " | " | " | 24 | 4.4 | 1.4 |
| 10 | " | " | " | " | " | 24 | " | 1.2 |
| 11 | 12.21 | 73.5 | 3.11 | 11.18 | " | None | | 1.2 |
| 12 | " | " | " | " | " | 24 | 4.4 | 1.1 |
| 13 | " | " | " | " | " | " | " | 1.5 |
| 14 | 10.97 | 74.5 | 2.98 | 11.55 | 1.71 | " | " | 1.5 |
| 15 | " | " | " | " | " | " | " | 1.8 |

Thus, by following the invention, the wax can be extracted from the micellar system, and acceptable Millipore test results are obtained even though the sample is subjected to a slow cool-down rate.

EXAMPLE III

This example shows the criticality of the minimum concentration of the extraction agent. In this example, the kerosene is added to neutralized crude oil sulfonic acids. The kerosene, wax, and unsulfonated crude oil are removed by phase separation after eight hours at 82.2° C. to yield the micellar system composition defined in Table III. The filtered samples are subjected to the slow cool-down rate defined in Example I wherein they are cooled from 37.8° C. to 4.4° C. without mixing and thereafter are heated to 18.3° C. before the Millipore test is run. The results of the Millipore test are indicated in Table III:

Table III

| Sample No. | Micellar System Composition (wt %) | | | | Weight of Kerosene per Weight of Active Sulfonate | Storage Prior* to Filtration | | Millipore Test |
|---|---|---|---|---|---|---|---|---|
| | Active Sulfonate | Water | Salt | Hydrocarbon | | Hours | ° C. | |
| 16 | 12.21 | 73.5 | 3.11 | 11.18 | 2.56 | 24 | 4.4 | 1.5 |
| 17 | 12.17 | 72.6 | 3.13 | 12.10 | 2.56 | " | " | 1.2 |
| 18 | 12.42 | 73.1 | 3.30 | 11.18 | 2.52 | " | " | 1.6 |
| 19 | 10.97 | 74.5 | 2.98 | 11.55 | 1.71 | " | " | 1.8 |
| 20 | 13.33 | 72.2 | 3.26 | 11.21 | 1.69 | " | " | 1.2 |
| 21 | 14.20 | 73.4 | 3.58 | 8.82 | 1.58 | " | " | 3.9 |
| 22 | 14.28 | 73.3 | 3.50 | 8.92 | 1.31 | " | " | 3.9 |
| 23 | 14.11 | 71.5 | 3.33 | 11.06 | 1.33 | " | " | 3.4 |
| 24 | 14.52 | 71.5 | 3.28 | 10.69 | 0.86 | " | " | 9.0 |
| 25 | 12.54 | 72.3 | 3.24 | 11.91 | 1.00 | 15 | " | 4.3 |

*Each sample is stored at 37.8° C. for an additional 1.5 hours prior to filtration.

The above data indicate that for this micellar system a criticality of at least 1.7 weights of the kerosene extraction agent per weight of active sulfonate must be used to pass the Millipore test.

It is not intended that the above data limit the invention. Rather, it is the intent that all of the equivalents obvious to those skilled in the art be incorporated within the scope of the invention as defined in the specification and appended claims.

What is claimed is:

1. In a process of injecting a micellar system comprising crude oil petroleum sulfonate, hydrocarbon and water into a hydrocarbon-bearing, subterranean formation via injection means and displacing the micellar system from the injection means and wherein the micellar system causes adverse injectivity problems due to wax in the micellar system the improvement comprising contacting the micellar system with about 0.5 to about 10 parts by weight of an extraction agent from the group consisting of paraffinic hydrocarbon or haloparaffin, having an average molecular weight of about 50 to about 200, per part by weight of sulfonate, permitting the resulting mixture to separate into at least two phases, separating the phase containing the wax and the paraffinic hydrocarbon or haloparaffin and thereafter injecting the extracted micellar system into the formation and displacing the hydrocarbon from the formation.

2. The process of claim 1 wherein the extraction agent is a paraffinic hydrocarbon having an average molecular weight of about 50 to about 200.

3. The process of claim 1 wherein the extraction agent contains up to 20% by weight of aromatics.

4. The process of claim 1 wherein the extraction agent is a halocarbon.

5. The process of claim 1 wherein the weight ratio of the extraction agent to the sulfonate is about 1:1 to about 5:1.

6. The process of claim 1 wherein the weight ratio of the extraction agent to the sulfonate is about 1.5:1 to about 3:1.

7. The process of claim 1 wherein the wax and unsulfonated crude oil are removed simultaneously.

* * * * *